US010543853B2

(12) United States Patent
Toyoda et al.

(10) Patent No.: US 10,543,853 B2
(45) Date of Patent: Jan. 28, 2020

(54) SYSTEMS AND METHODS FOR PROVIDING COLLABORATIVE CONTROL OF A VEHICLE

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Heishiro Toyoda, Ann Arbor, MI (US); Terumasa Endo, Miyoshi (JP)

(73) Assignees: Toyota Motor Engineering & Manufacturing North America, Inc., Plano, TX (US); Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 15/641,643

(22) Filed: Jul. 5, 2017

(65) Prior Publication Data

US 2019/0009794 A1     Jan. 10, 2019

(51) Int. Cl.
| | | |
|---|---|---|
| *B60W 50/14* | (2012.01) | |
| *G05D 1/00* | (2006.01) | |
| *B60W 50/10* | (2012.01) | |
| *B60W 50/12* | (2012.01) | |

(52) U.S. Cl.
CPC ........... *B60W 50/14* (2013.01); *B60W 50/10* (2013.01); *B60W 50/12* (2013.01); *G05D 1/0088* (2013.01); *B60W 2540/30* (2013.01)

(58) Field of Classification Search
CPC ...... B60W 50/14; B60W 50/10; B60W 50/12; B60W 2540/30; G05D 1/0088
See application file for complete search history.

(56) References Cited

U.S. PATENT DOCUMENTS

| | | | |
|---|---|---|---|
| 8,374,743 B2 | 2/2013 | Salinger | |
| 9,199,667 B2 | 12/2015 | Di Cairano et al. | |
| 9,464,410 B2 | 10/2016 | Johnson et al. | |
| 9,494,439 B1 | 11/2016 | Ross et al. | |
| 2003/0093210 A1* | 5/2003 | Kondo | B60G 17/0195 |
| | | | 701/96 |
| 2003/0164260 A1 | 9/2003 | Cole | |
| 2007/0129815 A1* | 6/2007 | Flemisch | G05B 7/02 |
| | | | 700/11 |
| 2012/0083947 A1 | 4/2012 | Anderson et al. | |
| 2012/0158247 A1 | 6/2012 | Norris et al. | |
| 2013/0096778 A1* | 4/2013 | Goto | B62D 5/008 |
| | | | 701/41 |

(Continued)

*Primary Examiner* — Sze-Hon Kong
(74) *Attorney, Agent, or Firm* — Christopher G. Darrow; Darrow Mustafa PC

(57) ABSTRACT

System, methods, and other embodiments described herein relate to providing collaborative controls for a vehicle. In one embodiment, a method includes, in response to receiving manual inputs and autonomous inputs for controlling the vehicle, determining a difference between the manual inputs and the autonomous inputs. The method includes blending the manual inputs and the autonomous inputs together into the collaborative controls as a function of at least the difference, and feedback parameters to control the vehicle to proceed along a route. The method includes generating feedback according to at least the difference to adapt how the vehicle is controlled.

20 Claims, 6 Drawing Sheets

(56) References Cited

U.S. PATENT DOCUMENTS

| | | | |
|---|---|---|---|
| 2015/0262484 A1* | 9/2015 | Victor | G09B 19/16 |
| | | | 701/1 |
| 2015/0284010 A1 | 10/2015 | Beardsley et al. | |
| 2016/0176440 A1* | 6/2016 | Witte | G05D 1/0088 |
| | | | 701/23 |
| 2017/0057520 A1 | 3/2017 | Letwin et al. | |
| 2017/0088143 A1 | 3/2017 | Goldman-Shenhar et al. | |
| 2017/0369073 A1* | 12/2017 | Huber | B60W 50/0098 |
| 2019/0023319 A1* | 1/2019 | Tyrrell | B62D 15/025 |
| 2019/0047592 A1* | 2/2019 | Lepczyk | B60W 50/16 |
| 2019/0071100 A1* | 3/2019 | Xavier | B60W 50/12 |

\* cited by examiner

SYSTEMS AND METHODS FOR PROVIDING COLLABORATIVE CONTROL OF A VEHICLE

TECHNICAL FIELD

The subject matter described herein relates in general to systems for providing collaborative controls for a vehicle and, more particularly, to generating the collaborative controls using multiple feedback paths in order to provide the collaborative controls in a robust manner.

BACKGROUND

Many different factors can influence how a passenger/driver perceives automated controls of a vehicle such as may be provided with collision avoidance systems, advanced cruise control, advanced driver assist systems (ADAS), and other autonomous or semi-autonomous forms of controlling a vehicle. For example, in general, when a vehicle generates autonomous controls, the autonomous controls are objectively computed according to an ideal path as viewed by the computational system. That is, the vehicle may produce autonomous controls that, for example, maintain the vehicle within a center portion of a lane. However, this style of operation can have negative perceptions by a driver because of too closely passing vehicles in adjacent lanes, erratic/unexpected maneuvers to sustain a particular path, and so on.

Moreover, autonomous controls generated by the vehicle can disrupt a sense of continuity in the driver when the controls intervene and/or are provided in an abrupt or jerky manner. Such inconsistencies can be due to, for example, complex control systems that fail to account for driver inputs. For example, in systems with shared control, two independent control streams are provided (e.g., manual and autonomous) which may oppose each other. However, because the two inputs are in opposition, the vehicle implements controls that can become quite complex to permit the separate controls to individually control the vehicle. Accordingly, resulting control of the vehicle can become erratic and lack robustness to provide a smooth and seamless ride. Thus, difficulties arise when attempting to implement autonomous and semi-autonomous controls within a vehicle that can undermine the trust of a driver in the autonomous/semi-autonomous controls.

SUMMARY

In one embodiment, example systems and methods relate to a manner of producing collaborative controls for controlling a vehicle. For example, in various embodiments, a vehicle may simultaneously receive manual inputs from a driver steering the vehicle and autonomous inputs from a control module of the vehicle that is performing some autonomous function (e.g., collision avoidance). In either case, the multiple inputs may conflict. In other words, the manual inputs may differ from the autonomous inputs. Thus, how the vehicle arbitrates the disparity between the inputs can not only affect how the vehicle is controlled but also a sense of trust in the driver about the autonomous aspects of the vehicle.

Thus, in one embodiment, a collaborative system functions as an additional input source to generate collaborative controls from the multiple inputs. For example, the collaborative system receives the manual inputs and the autonomous inputs and determines a difference therebetween. Accordingly, the collaborative system can then blend the inputs together in order to produce collaborative controls to control the vehicle. Moreover, the collaborative system further implements various feedback mechanisms in order to refine the collaborative controls and provide a robust manner of producing the collaborative controls. That is, in one embodiment, the collaborative system generates feedback in the form of adaptation feedback, personalization feedback, and coaching feedback in order to adjust how the collaborative controls are produced.

For example, the collaborative system generates the adaptation feedback to objectively improve upon how the autonomous inputs are generated. That is, the collaborative system refines the autonomous parameters used to produce the autonomous inputs with newly learned circumstances and/or other factors. Furthermore, the collaborative system also generates the personalization feedback that adjusts how the autonomous inputs are generated according to preferences of the driver. Moreover, the collaborative system also generates the coaching feedback to influence how the driver provides the manual inputs. In this way, the collaborative system provides a robust mechanism for blending the separate inputs into a seamless manner of controlling the vehicle that, for example, avoids erratic/unexpected maneuvers.

In one embodiment, a collaborative system for providing collaborative control of a vehicle is disclosed. The collaborative system includes one or more processors and a memory. The memory is communicably coupled to the one or more processors and stores a controls module and a feedback module. The controls module includes instructions that when executed by the one or more processors cause the one or more processors to, in response to receiving manual inputs and autonomous inputs for controlling the vehicle, determine a difference between the manual inputs and the autonomous inputs. The controls module includes instructions to blend the manual inputs and the autonomous inputs together into collaborative controls as a function of at least the difference, and feedback parameters to control the vehicle to proceed along a route. The feedback module including instructions that when executed by the one or more processors cause the one or more processors to generate feedback according to at least the difference to adapt how the vehicle is controlled.

In one embodiment, a computer readable memory for providing collaborative control of a vehicle is disclosed. The computer-readable memory stores instructions that when executed by one or more processors cause the one or more processors to perform functions. The instructions include instructions to, in response to receiving manual inputs and autonomous inputs for controlling the vehicle, determine a difference between the manual inputs and the autonomous inputs. The instructions include instructions to blend the manual inputs and the autonomous inputs together into collaborative controls as a function of at least the difference, and feedback parameters to control the vehicle to proceed along a route. The instructions include instructions to generate feedback according to at least the difference to adapt how the vehicle is controlled.

In one embodiment, a method for providing collaborative controls for a vehicle is disclosed. The method includes, in response to receiving manual inputs and autonomous inputs for controlling the vehicle, determining a difference between the manual inputs and the autonomous inputs. The method includes blending the manual inputs and the autonomous inputs together into the collaborative controls as a function of at least the difference, and feedback parameters to control the vehicle to proceed along a route. The method includes generating feedback according to at least the difference to adapt how the vehicle is controlled.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
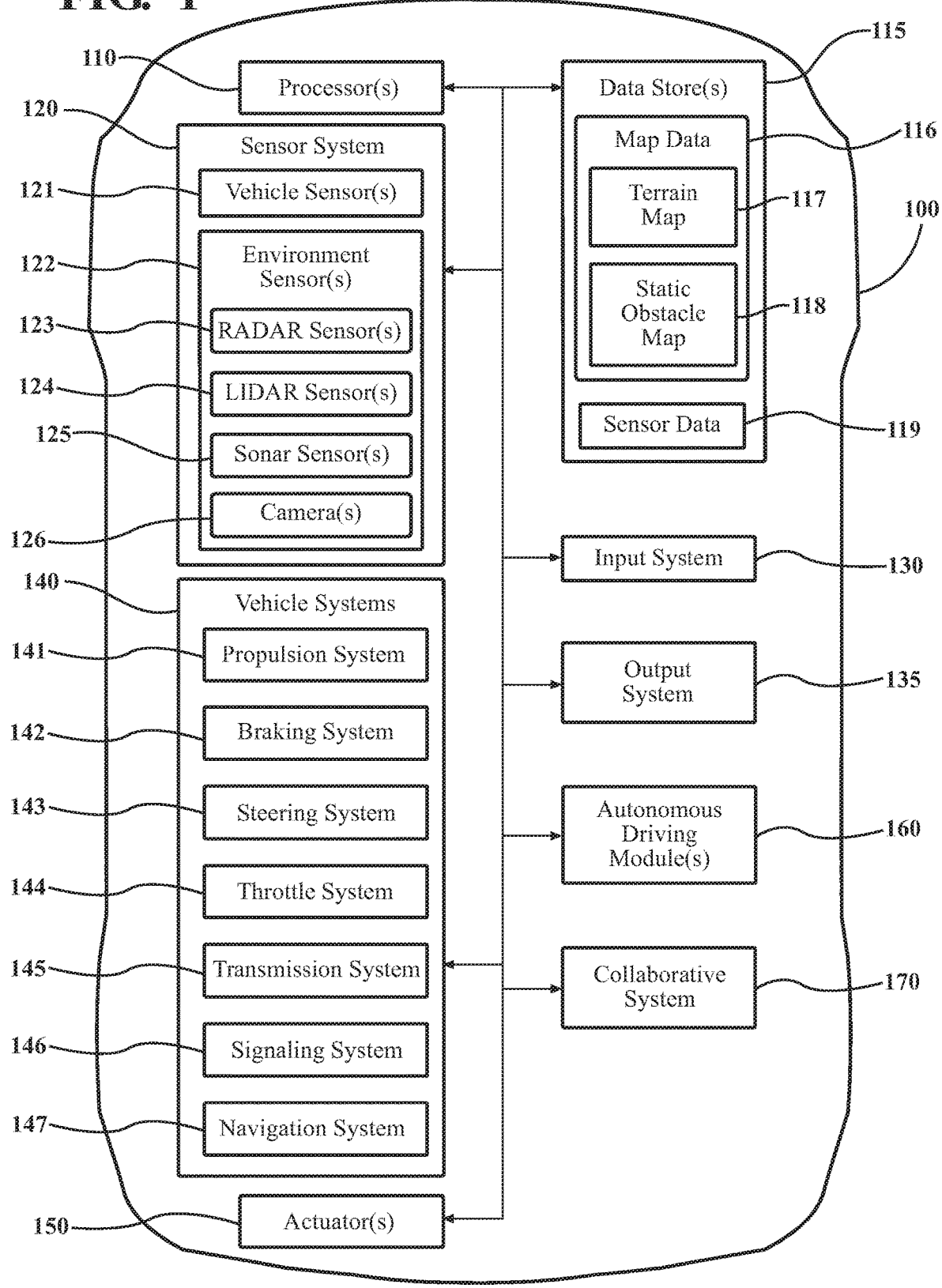
FIG. 1 illustrates one embodiment of a vehicle within which systems and methods disclosed herein may be implemented.

Systems, methods and other embodiments associated with generating collaborative controls are disclosed. As mentioned previously, a vehicle can include different sources of inputs for controlling steering or other aspects of operation. Thus, during operation the different inputs, if provided simultaneously can conflict causing, in some examples, undesirable control of the vehicle.

Accordingly, embodiments of a collaborative system and associated methods are disclosed herein to provide collaborative controls by arbitrating control inputs from multiple sources using various feedback mechanisms. In one embodiment, functionality implemented by a disclosed collaborative system is provided according to analogous biomechanics concepts associated with bi-articular muscles. In general, the concept of bi-articular muscles relates to redundant muscles that support the same function. That is, as one example, a human arm generates a contact force against a wall (e.g., push against a wall) using at least three separate muscles to contribute to generating the contact force. In this way, the human arm provides a steady and robust force that can adapt to various angles of applying the contact force, and so on.

By contrast, if a robotic arm is implemented with two force generating mechanisms but lacks a third that would mirror a third muscle (bi-articular muscle) in the human, then the robotic arm, while capable of applying a contact force to a surface may suffer from difficulties with different angles of applying the contact force and an ability to maintain a steady force. Accordingly, the presence of the additional redundant force applying mechanisms, as noted with bi-articular muscles, provides for a robust, muscular mechanism that can adapt to varying conditions.

Thus, in a similar way, the presently disclosed collaborative system and associated methods provide for improving shared control of the vehicle by using additional mechanisms that improve upon the robustness of the controls. That is, in one embodiment, in addition to manual inputs and autonomous inputs for controlling the vehicle, the collaborative system provides additional inputs that function to blend the manual and autonomous inputs into collaborative controls while also using multiple feedback mechanisms. The feedback mechanisms implemented with the collaborative system function to inform various aspects of how the manual inputs and the autonomous inputs are produced such that the collaborative system can refine the inputs while also providing additional redundancy through generating the collaborative controls. In this way, the collaborative system mirrors concepts of bi-articular muscles to improve robustness in how shared controls (i.e., collaborative controls) are generated for controlling the vehicle.

Consequently, in one embodiment, the collaborative system and/or other aspects of the vehicle (e.g., autonomous module) can monitor the surrounding environment to identify aspects about the roadway, objects, obstacles, and so on to generate the autonomous inputs while also receiving the manual inputs from the driver through one or more inputs devices (e.g., steering wheel). In either case, the collaborative system compares the autonomous inputs with the manual inputs to derive a metric for determining how closely the driver is controlling the vehicle to the autonomous inputs and vice versa. Thus, in one embodiment, the collaborative system produces the metric as a difference between the autonomous inputs and the manual inputs to determine how closely the driver is controlling the vehicle to the driving path. As a result, the collaborative system can generate, for example, collaborative controls that are a blend of the manual inputs and the autonomous inputs as a function of the difference and/or other parameters (e.g., present contextual parameters, etc.) in order to provide robust control of the vehicle.

Moreover, in further aspects, the collaborative system implements multiple feedback mechanisms to refine and otherwise improve inputs to the collaborative system. That is, in one embodiment, the collaborative system generates feedback (i) to coach the driver and influence how the manual inputs are generated, (ii) to adapt how the vehicle generates the autonomous inputs, and (iii) to personalize the autonomous inputs according to preferences of the driver. In this way, the collaborative system can improve shared controls for operating the vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a collaborative system 170 that is implemented to perform methods and other functions as disclosed herein relating to generating collaborative controls for operating the vehicle 100. As a result of the collaborative system 170 generating the collaborative controls, the vehicle 100 is operated (e.g., steered) via inputs from both the driver and computed by the vehicle 100 that are blended together according to a difference between the inputs and/or other factors for generating the controls.

Figure 2:
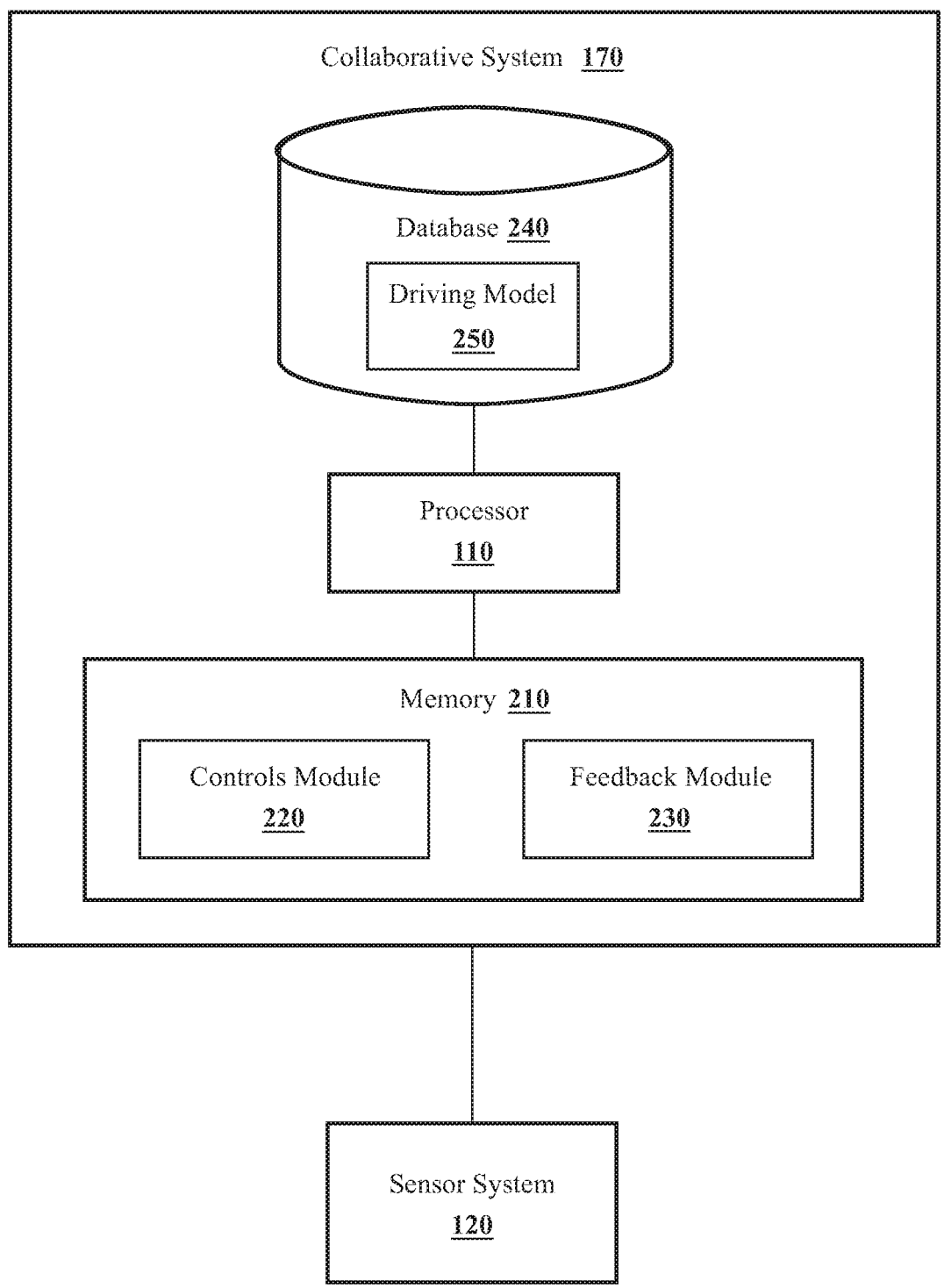
FIG. 2 illustrates one embodiment of a collaborative system that is associated with generating collaborative controls for controlling a vehicle.

With reference to FIG. 2, one embodiment of the collaborative system 170 of FIG. 1 is further illustrated. The collaborative system 170 is shown as including a processor 110 from the vehicle 100 of FIG. 1. Accordingly, the processor 110 may be a part of the collaborative system 170, the collaborative system 170 may include a separate processor from the processor 110 of the vehicle 100, or the collaborative system 170 may access the processor 110 through a data bus or another communication path. In one embodiment, the collaborative system 170 includes a memory 210 that stores a controls module 220 and a feedback module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the controls module 220 generally includes instructions that function to control the processor 110 to collect sensor data from one or more sensors of the vehicle 100 and to, in one embodiment, compute autonomous inputs. In alternative embodiments, the autonomous module 160 can instead collect the sensor data and/or compute the autonomous inputs. In either case, the autonomous inputs generally include steering inputs for controlling a direction of the vehicle 100. In further embodiments, the autonomous inputs can also include accelerator inputs, braking inputs, and so on. However, for purposes of the present discussion, the autonomous inputs will generally be discussed as steering inputs for controlling a direction/heading of the vehicle 100.

Moreover, the sensor data is, in one embodiment, electronic data that the controls module 220 collects about observations of one or more objects in an environment proximate to and surrounding the vehicle 100. For example, the controls module 220 controls one or more sensors of the sensor system 120 to scan a surrounding environment of the vehicle 100 in order to identify objects and other aspects of the environment. Thus, by way of example, the controls module 220 controls the lidar 124 to generate a point cloud of the surrounding environment and identify objects/obstacles from the point cloud in addition to, for example, boundaries of the roadway on which the vehicle 100 is traveling.

The controls module 220 and/or the autonomous driving module 160, can then analyze the surrounding environment and compute the autonomous inputs to control the vehicle 100 through the surrounding environment. Thus, by way of example, the autonomous driving module 160 can analyze the sensor data according to a machine learning algorithm and the driving model 250 which produces the autonomous inputs as an optimal/target manner of controlling the vehicle 100 through the surrounding environment.

Contemporaneously, the controls module 220 receives manual inputs from a driver of the vehicle 100. In one embodiment, the controls module 220 receives electronic signals as the manual inputs that are produced when the driver operates a steering wheel of the vehicle 100. As with the autonomous inputs, the manual inputs can also include accelerator inputs, braking inputs, and so on in various embodiments.

In either case, the controls module 220, in one embodiment, generates collaborative controls for steering and/or otherwise controlling the vehicle 100 by blending the manual inputs with the autonomous inputs. In this way, the collaborative system 170 arbitrates differences between the inputs to prevent erratic maneuvers and to provide a more robust mechanism for controlling the vehicle 100. In other words, in one embodiment, the controls module 220 determines a difference between the manual inputs and autonomous inputs. While the controls module 220 is discussed as performing the comparison of the inputs and the generating of the collaborative controls in a discrete manner, in various implementations, the controls module 220 iteratively performs the noted functions at a regular interval (e.g., 0.05 s) such that the collaborative controls are seemingly provided in a continuous manner. In ether case, the controls module 220 produces the difference to characterize how closely the inputs match, to assess current driving conditions, and so on.

The controls module 220, in one embodiment, generates the collaborative controls by blending the inputs according to a weighted value (e.g., 50/50, 60/40, 70/30, etc.) that can be provided as a function of the difference between the inputs, a skill level of the driver, a familiarity of the driver with current operating conditions/the surrounding environment, according to defined preferences, feedback parameters, and so on. Moreover, in further aspects, the controls module 220 can learn how to blend the inputs according to a machine learning algorithm in order to balance the manual inputs with the autonomous inputs while still accounting for various other factors such as those previously noted. In either case, the controls module 220 generates the collaborative controls for operating the vehicle 100 such that the collaborative controls are semi-autonomous controls that represent a blend of the separate inputs.

As a further matter, in one embodiment, the collaborative system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 stores the sensor data along with, for example, metadata that characterizes various aspects of the sensor data. For example, the metadata can include location coordinates (e.g., longitude and latitude), relative map coordinates or tile identifiers, time/date stamps from when the separate sensor data was generated, and so on.

Furthermore, the controls module 220 can store log data in the database 240 or another data store about the collaborative controls, the manual inputs, the autonomous inputs, driver responses, the sensor data about the surrounding environment and present context, and so on. Thus, in one or more embodiments, the controls module 220 can use the log data to subsequently learn driver preferences, refine the autonomous inputs, and so on.

Moreover, the database 240 may include one or more computational and/or statistical models such as a driving model 250. In one embodiment, the driving model 250 characterizes the sensor data about the surrounding environment in order to identify the autonomous inputs. That is, the controls module 220 uses the driving model 250 to produce the autonomous inputs according to the sensor data and the skill level of the driver. Accordingly, in one embodiment, the driving model 250 informs the controls module 220 about how to control the vehicle 100 in the surrounding environment according to learned/modeled data.

Furthermore, the driving model 250 can also inform the controls module 220 about how to blend the inputs as a function of the sensor data, the difference, and/or other informing information. Moreover, in an additional embodiment, the driving model 250 in combination with the controls module 220 can identify a skill level of the driver according to, for example, present driving behaviors of the driver (e.g., the manual inputs), historical driving data about previous trips of the driver, and other data that can be collected about the driver, which characterizes how the driver operates the vehicle 100. Thus, in one embodiment, the controls module 220 can determine the skill level of the driver and characterize the abilities of the driver when controlling the vehicle 100 that is further accounted for when, for example, blending the inputs to generate the collaborative controls. As a further example, the controls module 220 can characterize which maneuvers the driver is likely capable of performing, how precisely the driver can control the vehicle 100, how engaged/aware the driver is when controlling the vehicle 100, and so on. As such, the controls module 220 can consider the noted factors when generating the collaborative controls and/or the feedback module 230 can account for the driver skill level/abilities when generating the personalization feedback and/or coaching feedback.

For example, the controls module 220 can collect information about the driver, information about contextual aspects of the present environment (e.g., time of day, the day of the year, school zones, proximity to parks, etc.), and so on. Accordingly, the controls module 220 can control the sensor system 120 to collect data about both the surroundings, a present context, and about a state of the driver. In one embodiment, driver state information is information that characterizes present actions of the driver (e.g., manual inputs provided by the driver), where a gaze of the driver may be directed, autonomic responses of the driver, biological responses/conditions of the driver, manual inputs from the driver under particular conditions, and so on.

Continuing with FIG. 2, in one embodiment, the feedback module 230 includes instructions that function to control the processor 110 to generate feedback to refine the manual inputs and the autonomous inputs. As presented herein, the feedback can take several different forms including adaptation feedback, personalization feedback, and coaching feedback. In general, the various forms of feedback which the feedback module 230 produces are generated in order to refine or otherwise adjust either the autonomous inputs or the manual inputs. That is, the feedback module 230 implements the noted feedback mechanisms in order to adjust the inputs and thereby further improve how the collaborative controls are generated. Further aspects of generating the feedback and the collaborative controls will be discussed in relation to the subsequent figures.

Figure 3:
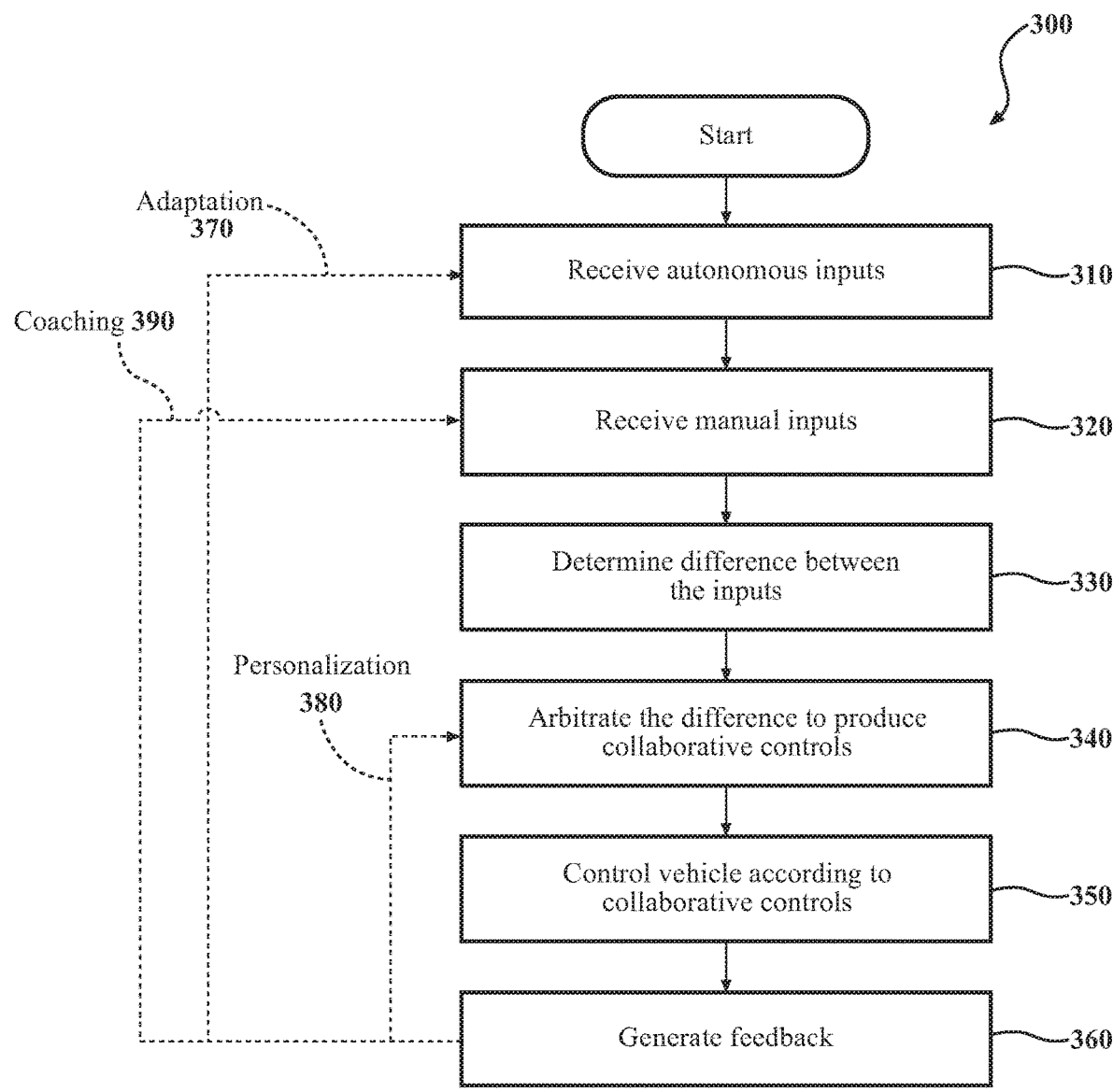
FIG. 3 illustrates one embodiment of a method that is associated with generating collaborative controls by blending manual inputs with autonomous inputs.

FIG. 3 illustrates a flowchart of a method 300 that is associated with generating collaborative controls and feedback for adjusting the collaborative controls. Method 300 will be discussed from the perspective of the collaborative system 170 of FIGS. 1 and 2. While method 300 is discussed in combination with the collaborative system 170, it should be appreciated that the method 300 is not limited to being implemented within the collaborative system 170, but is instead one example of a system that may implement the method 300.

At 310, the controls module 220 receives autonomous inputs. In one embodiment, the controls module 220 acquires the autonomous inputs as electronic controls that are produced by the vehicle 100 for autonomously controlling the vehicle 100 along a current route of the vehicle 100 through the surrounding environment. As previously indicated, the controls module 220 can generate the autonomous inputs, the autonomous driving module 160 can generate the autonomous inputs, or a combination of the two modules 220 and 160 can generate the autonomous inputs.

In either case, sensor data from the vehicle 100 is collected and analyzed in order to generate the autonomous inputs that are received by the controls module 220. Accordingly, in one embodiment, the controls module 220 collects sensor data at 310 about the surrounding environment and produces the autonomous inputs therefrom. In one embodiment, the controls module 220 collects data from sensors of the sensor system 120 including lidar 124, radar 123, and/or other sensors on at least a semi-continuous basis. That is, for example, the controls module 220 collects the sensor data every x seconds (e.g., 0.01 s) to maintain an up-to-date view of the surrounding environment. In general, the controls module 220 is operable to collect data from whichever sensors are available within the vehicle 100 and/or collect data from third party sources (e.g., weather sources, traffic sources, etc.) through, for example, a communications system of the vehicle 100.

In either case, the controls module 220 generally collects electronic sensor data for determining a route through the surrounding environment and, in one embodiment, information about driving behaviors of the driver. For example, the controls module 220 can collect environmental information, contextual information, and driver state information. The environmental information is information about the surroundings of the vehicle 100 including information about objects (e.g., locations and trajectories), obstacles, terrain, surfaces, roadway boundaries, and so on.

The contextual information is generally ancillary data or metadata about a current location and/or general context including information such as a time of day, a day of the week, geopolitical boundaries, municipal boundaries and special districts (e.g., school zones), local laws (e.g., speed limits), operating characteristics of the vehicle 100 (e.g., brake wear, oil levels, etc.), weather, road surface conditions, and so on.

The driver state information generally characterizes a current awareness and physical state of the driver and includes, for example, a current gaze/line-of-sight of the driver, eye tracks/movements, rates of eye movements, pupil dilation, control inputs received from the driver through vehicle input devices and patterns of control inputs, and/or other information that is indicative of engagement/awareness of the driver in relation to driving tasks and the surrounding environment. In further embodiments, the driver state information also includes logging patterns in the manual inputs in relation to the surrounding environment, the current contextual conditions, a driver skill level and/or familiarity with a present location, and so on.

In general, the controls module 220 collects information at 310 that informs the collaborative system 170 about the surrounding environment and the driver in order to facilitate providing the collaborative controls and/or the feedback as discussed further subsequently. Thus, while the above examples of different forms of data are provided, the noted data is provided as an exemplary listing and should not be construed as a complete/limiting list of data elements that may be collected and/or considered by the system 170.

In either case, the controls module 220 generates the autonomous inputs for maintaining the vehicle 100 along the route in, for example, an optimal manner (e.g., optimizing safety). Thus, in one embodiment, the controls module 220, and/or the autonomous driving module 160, in combination with, for example, the driving model 250 form a machine learning algorithm or another computational model that accepts the noted data as an electronic input and produces the autonomous inputs as an electronic output. Furthermore, the controls module 220, the driving model 250 and the autonomous driving module 160 can act in concert to produce the autonomous inputs as though the vehicle 100 was being autonomously controlled. As a further matter, while the determination of the autonomous inputs is discussed as a singular discrete event, it should be appreciated that in various embodiments the collection of data at 310 and the computing of the autonomous inputs can occur in parallel and are updated at a rate that accounts for changes in the surrounding environment in order to maintain safe operation of the vehicle 100.

At 320, the controls module 220 receives the manual inputs. In one embodiment, the controls module 220 acquires the manual inputs as electronic control signals received by the vehicle from a driver through one or more input/output devices of the vehicle 100. Thus, the controls module 220 can intercept, sniff, or otherwise acquire the manual inputs from the vehicle 100 as an electronic signal characterizing controls provided by the driver. In either case, the controls module 220 receives the manual inputs from the driver. In one embodiment, the controls module 220 continuously monitors the various input devices of the vehicle 100 in order to track the manual inputs and patterns in the inputs provided by the driver. Accordingly, the controls module 220 can acquire electronic inputs from a steering wheel, a brake pedal, an accelerator pedal, a clutch, a shifter, vehicle indicators, and other manual inputs provided by the driver. However, in general, the controls module 220 can focus on manual inputs that directly relate to steering the vehicle 100 such as inputs from the steering wheel.

At 330, the controls module 220 compares the autonomous inputs with the manual inputs. In one embodiment, the feedback module 230 compares the separate controls to determine a difference between the autonomous inputs and the manual inputs provided by the driver. For example, the feedback module 230 can compare a magnitude, a direction, a rate of change, patterns in the manual inputs to determine an extent or degree of mismatch between the inputs that is provided as the difference. Furthermore, in various implementations, the controls module 220 can, for example, generate a combined difference according to a heuristic that operates to characterize an overall difference of the inputs when multiple inputs (e.g., steering, braking, etc.) are being characterized that uses a single value. Thus, in one embodiment, the controls module 220 can analyze the autonomous inputs along with the manual inputs using a machine learning algorithm or a heuristic that generates an electronic output that characterizes an extent/degree of difference between the inputs using a single electronic value. In either case, the controls module 220 determines how closely the manual inputs correlate with the autonomous inputs in order to characterize how closely the driver is controlling the vehicle 100 to the autonomous inputs.

Moreover, while a single discrete comparison is discussed, it should be appreciated that the controls module 220 can iteratively compare the manual inputs with the autonomous inputs in an on-going manner and, for example, in parallel with further aspects of the method 300. Thus, as the vehicle 100 progresses along the roadway, the controls module 220, in one embodiment, iteratively compares the autonomous inputs with the manual inputs in order to provide a real-time assessment of the difference. Moreover, in further aspects, the controls module 220 can accumulate the differences from multiple comparisons in order to provide a combined comparison over a period of time.

At 340, the controls module 220 blends the manual inputs and the autonomous inputs together into the collaborative controls as a function of at least the difference, and feedback parameters to control the vehicle to proceed along the route. In one embodiment, the controls module 220 analyzes the difference, the feedback parameters, sensor data that characterizes a current context of the vehicle 100, data about the driver, and/or other information to determine how to blend the manual inputs with the autonomous inputs. That is, in general, the process undertaken by the controls module 220 to generate the collaborative controls for operating the vehicle 100 includes combining the inputs together in varying ratios depending on multiple factors as embodied by the different informational elements.

Thus, the controls module 220, in one embodiment, analyzes the noted data according to the driving model 250 and a machine learning algorithm embodied within the controls module 220 (e.g., neural network, etc.) in order to identify a weighting of the manual inputs versus the autonomous inputs. In further embodiments, the controls module 220 determines the ratio/weighting according to a look-up table that uses one or more of the specified informational elements as inputs, as a heuristic, and so on. In either case, the controls module 220 determines the ratio/weighting and uses the ratio to blend the inputs together into the collaborative controls. Thus, the controls module 220 provides an electronic output that embodies the collaborative controls and which is a semi-autonomous control for operating the vehicle 100.

As a further matter, the feedback parameters, which will be discussed in greater detail subsequently, generally relate to, for example, preferences of the driver in how the collaborative controls are to be provided. By way of example, the feedback parameters can include preferred following distances, particular contexts to avoid (e.g., passing semi-trucks), and so on. In general, the controls module 220 can analyze and use many different aspects relating to the driver, the present context, the difference, the surrounding environment, the feedback parameters, and so on when determining how to blend the manual inputs with the autonomous inputs. In either case, the controls module 220 executes the process of blending the manual inputs and the autonomous inputs as a manner of providing additional input to how the vehicle 100 is controlled and, thus, to mirror the noted concepts of redundancy as previously explained. In this way, the noted systems and methods improve the robustness of the controls.

At 350, the controls module 220 controls the vehicle 100 according to the collaborative controls. That is, the controls module 220 electronically provides the collaborative controls to one or more of the vehicle systems 140 in place of the manual inputs and the autonomous inputs. Thus, the controls module 220 provides for semi-autonomously controlling the vehicle 100 through operating the vehicle 100 according to the collaborative controls that include at least a portion of the autonomous inputs generated by the vehicle 100. In either case, the controls module 220, in one embodiment, selectively overrides or otherwise ignores at least a portion of the manual inputs provided by the driver when controlling the vehicle 100 according to the collaborative controls.

At 360, the feedback module 230 generates feedback to adapt how the vehicle 100 is controlled. In one embodiment, the feedback module 230 generates the feedback according to at least the difference between the manual inputs and the autonomous inputs. That is, the feedback module 230 can track or otherwise monitor the difference to identify patterns relating to driver preference and/or instances where the autonomous inputs are, for example, less than optimal for controlling the vehicle safely in the surrounding environment for the current context. Accordingly, the feedback module 230 can adjust feedback parameters that influence how the collaborative controls are generated and/or adjust aspects relating to the manual inputs and the autonomous inputs. In either case, the feedback module 230 provides multiple separate feedback mechanisms for informing various aspects of the collaborative system 170 about how the vehicle 100 is operating and inducing adjustments therefrom in order to improve the operation with the collaborative controls.

In one embodiment, the feedback module 230 generates multiple separate forms of feedback simultaneously and in parallel to adjust the collaborative controls while the vehicle 100 is operating. In one embodiment, the feedback includes an adaptation feedback, a personalization feedback 380, and a coaching feedback. The feedback module 230 generates the adaptation feedback 370 to adjust autonomous parameters for controlling how the vehicle generates the autonomous inputs. For example, the feedback module 230 either independently or in concert with the controls module 220 logs driving data about how the vehicle 100 is proceeding along the route. For example, the feedback module 230 can log data about the autonomous inputs, the sensor data, the present context, the driver, the manual inputs, the difference between the inputs, and other information that informs the feedback module 230 about circumstances surrounding different autonomous inputs generated by the vehicle 100.

Thereafter, the feedback module 230 analyzes the logged data to assess how closely to an objective standard of safety (e.g., defined protocol for operating the vehicle 100 safely) the provided autonomous inputs rank. That is, the feedback module 230 can score or otherwise analyze the logged data according to a machine learning algorithm and the driving model 250 to learn aspects about the autonomous inputs and adjust how the vehicle 100 generates the autonomous inputs therefrom. Moreover, in one embodiment, the feedback module 230 can consider input from the driver that, for example, indicates the autonomous inputs are inappropriate/unsafe, indicates an attempt to correct the autonomous inputs through the manual inputs, and so on as indicators of whether the autonomous inputs are satisfactory.

Furthermore, in one embodiment, the feedback module 230 analyzes the logged data contemporaneously with operation of the vehicle 100, subsequent to one or more trips with the vehicle 100, and/or a combination thereof. Thus, in one embodiment, the feedback module 230 provides the adaptation feedback 370 as both a short-term feedback and as a long-term learning adjustment to how the vehicle 100 generates the autonomous inputs.

Accordingly, the feedback module 230, in one embodiment, can compare the logged data to a large data set from an original equipment manufacturer (OEM), a cloud-based repository, or another storage location that stores crowd-sourced, or otherwise populated/acquired data sets about driving to learn whether the autonomous inputs are satisfactory and to adjust according to classified/labeled data sets. In either case, the feedback module 230 generates the adaptation feedback 370 to improve how the autonomous inputs are generated through applying a machine learning algorithm to the driving data that optimizes safety.

Continuing with the different forms of feedback produced by the feedback module 230, in one embodiment, the feedback module 230 generates personalization feedback 380. The personalization feedback 380 relates to preferences of the particular driver and adjusts autonomous parameters for controlling how the vehicle 100 generates the autonomous inputs. Moreover, in one embodiment, instead of adjusting the autonomous inputs directly, the feedback module 230 can use the autonomous parameters to adjust a ratio of the manual inputs to the autonomous inputs when producing the collaborative controls at 340. That is, in one embodiment, the feedback module 230 learns or otherwise determines through direct electronic feedback from the driver about preferences of the driver in relation to driving style. The feedback module 230 can then control how the autonomous inputs are generated or blended into the collaborative controls in order to account for the preferences. By way of example, the feedback module 230 learns aspects of how the driver prefers that the vehicle 100 be controlled such as position within a lane, proximity to passing vehicles or vehicles/obstacles that are being passed (e.g., proximity to a semi-truck when passing the truck on a highway), velocity preferences, braking preferences, preferred g-forces for turns in roads, preferred styles of executing turns, preferred following distances, and so on.

In various embodiments, the feedback module 230 learns the preferences of the driver by analyzing manual inputs provided by the driver for the different circumstances, electronically querying the driver about the preferences, and so on. For example, the feedback module 230 can collect personalization data including manual inputs from the driver, driving data (e.g., sensor data, etc.), contextual information about the present driving conditions, and so on. Accordingly, the feedback module 230 can generate the personalization feedback 380 from the logged data by analyzing the logged data for patterns using a machine learning algorithm, or by specifically indicated circumstances from the driver. Thereafter, the personalization feedback is used by the collaborative system 170 to adjust the autonomous parameters and/or how the inputs are blended for various circumstances that arise.

Lastly, the feedback module 230 generates coaching feedback 390 to induce the driver to adjust how the manual inputs are provided. In one embodiment, the feedback module 230 generates the coaching feedback 390 by analyzing the difference between the inputs in relation to a surrounding/present environment of the vehicle 100 to identify whether the manual inputs are an acceptable manner for controlling the vehicle 100. Thus, the feedback module 230 can generate the coaching feedback 390 to induce the driver to adjust the manual inputs. In one embodiment, the coaching feedback 390 is generated as one or more of forced feedback in a steering wheel, and/or indicators about the manual inputs that are displayed or otherwise conveyed to the driver.

Moreover, in one embodiment, the feedback module 230 generates the coaching feedback 390 to indicate inadequate manual inputs. In one embodiment, when the feedback module 230 determines that the difference between the inputs satisfies a threshold variance (e.g., exceeds), then the feedback module 230 generates the coaching feedback according to an extent of the difference between the inputs. That is, in one embodiment, the feedback module 230 generates the active feedback to be proportional to the difference between the autonomous inputs and the manual inputs.

Furthermore, the feedback module 230 can produce the coaching feedback in different forms depending on a particular implementation and/or preference. For example, the feedback module 230 can generate the feedback as a resistive force against the manual inputs within input devices of the vehicle 100 used by the driver to provide the manual inputs. Thus, in one embodiment, as the driver controls the vehicle 100 and provides the manual inputs, the feedback module 230 determines when the manual inputs being provided by the driver exceed the threshold variance and provides resistive/forced feedback against the manual inputs as a "nudge" within the input devices. Accordingly, by way of example, the feedback module 230 can resist excessive steering angle within the steering wheel. Moreover, in one embodiment, the feedback module 230 can push back against the manual inputs to cause the input devices to be positioned in a manner that is consistent with the autonomous inputs when the manual inputs satisfy the threshold variance.

In still further embodiments, the feedback module 230 can generate the coaching feedback 390 as haptic feedback within the input devices of the vehicle 100 that, for example, correlate with a particular manual input that is inadequate. Alternatively, the feedback module 230 can provide the coaching feedback 390 as haptic vibrations within all inputs, within a seat of the vehicle 100, and so on. In further embodiments, the feedback module 230 can provide additional feedback such as lights, audible feedback, a driving score, instructions about errors in the manual inputs and so on in order to inform the driver of how closely the manual inputs comply with the autonomous inputs. In either case, the feedback module 230 generates the coaching feedback as a manner of inducing the driver to change how the manual inputs are being provided.

Figure 4:
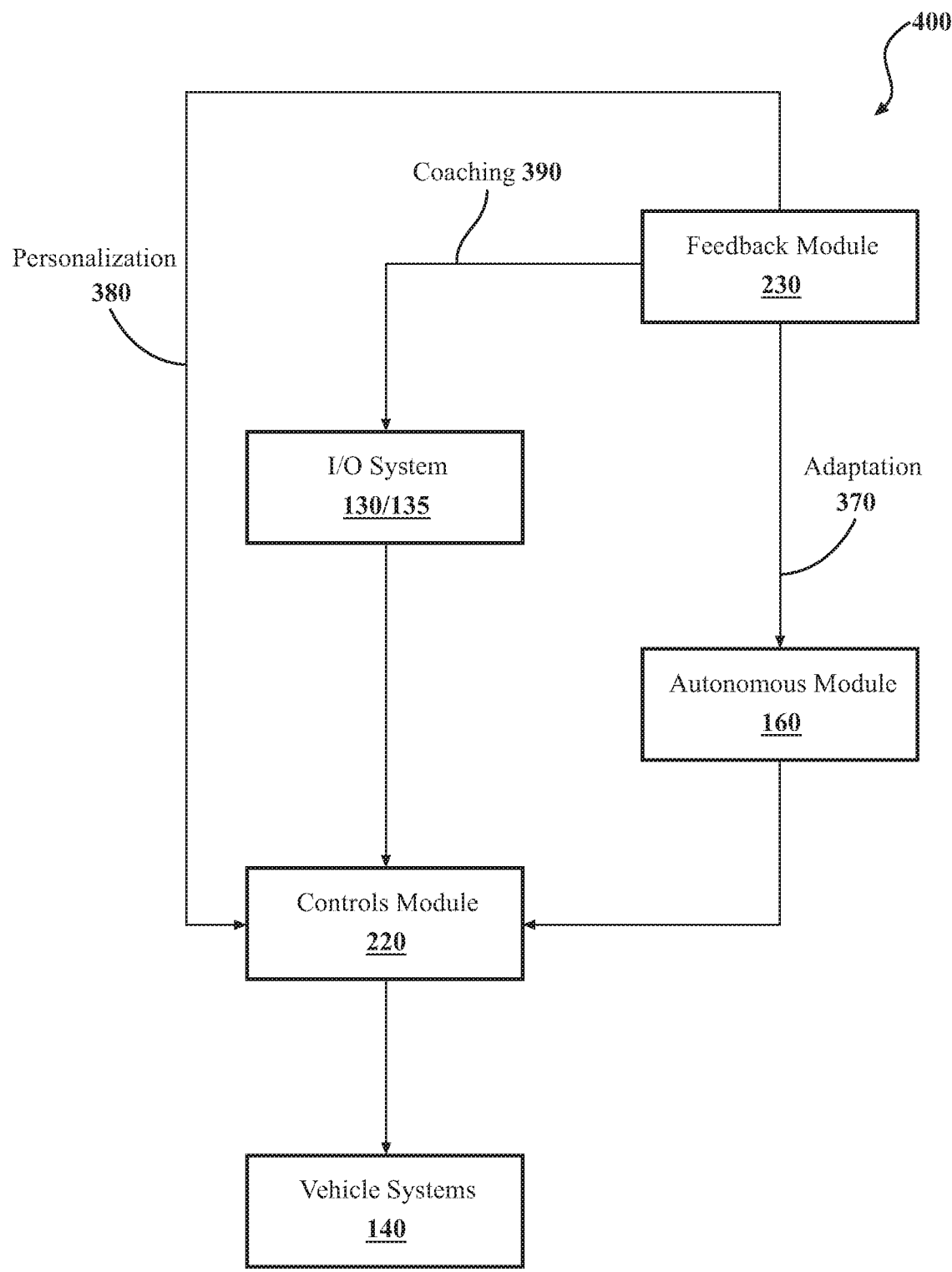
FIG. 4 is a diagram illustrating various feedback mechanisms and data paths associated with feedback mechanisms as discussed herein.

Further explanation of the functioning of the collaborative system 170 will be discussed in relation to FIGS. 4-6. With reference to FIG. 4, a diagram 400 illustrating various feedback mechanisms and data paths associated with the feedback mechanisms as discussed herein is illustrated. That is, FIG. 4 illustrates one embodiment of how the collaborative system 170 provides redundancy within inputs and provides data paths for adjusting operation of various aspects of the vehicle 100. Accordingly, as illustrated, the feedback module 230 provides the adaptation feedback 370 to the autonomous module 160 via one electronic data path. Moreover, the autonomous driving module 160 is illustrated as providing input, and, more particularly, the autonomous inputs to the controls module 220 as adjusted according to the feedback module 230.

Furthermore, the feedback module 230 provides the personalization feedback 380 through an electronic data path directly to the controls module 220 so that preferences of the driver can be used to adapt how the inputs are blended to form the collaborative controls under various circumstances. Additionally, the feedback module 230 provides the coaching feedback 390 through one or more electronic data paths to the I/O systems 130/135 of the vehicle 100 in order to communicate the coaching feedback 390 to the driver and induce the driver to modify how the manual inputs are being provided. In either case, from the diagram 400 the feedback provided by the feedback module 230 generally progresses to the controls module 220 through various data paths in order to adjust how the controls module 220 produces the collaborative controls. In this way, the collaborative system 170 provides several different inputs and pathways for adding redundancy and robustness to how the vehicle 100 is controlled.

In regards to the I/O systems 130/135, the vehicle 100 includes, in one embodiment, hardware and/or software elements to selectively generate interference between manual inputs and autonomous inputs, depending on the purpose and/or the form of feedback. That is, blending between the autonomous inputs and the manual inputs can be provided as "interference" or physical modification (e.g., force feedback) of the manual input mechanisms (e.g., steering wheel) to inform the driver about the blending/autonomous inputs. Moreover, at times when no interference is desired with the manual inputs, the I/O systems 130/135 can blend the inputs without informing the driver through the I/O systems. For example, in order to not interfere between the separate inputs, a mechanism accepting dual inputs from both the driver and the system (e.g., planetary gear mechanism, clutch mechanism) can be used. Thus, for the adaptation feedback 370 or the personalization feedback 380 no physical pushback may be felt by the driver because of the particular mechanism that accepts the dual inputs isolates the blending from the driver. By contrast, in order to interfere between the inputs, resistive components (e.g., variable resistance spring) can be used when providing the coaching feedback 390 so that the driver feels the blending.

Figure 5:
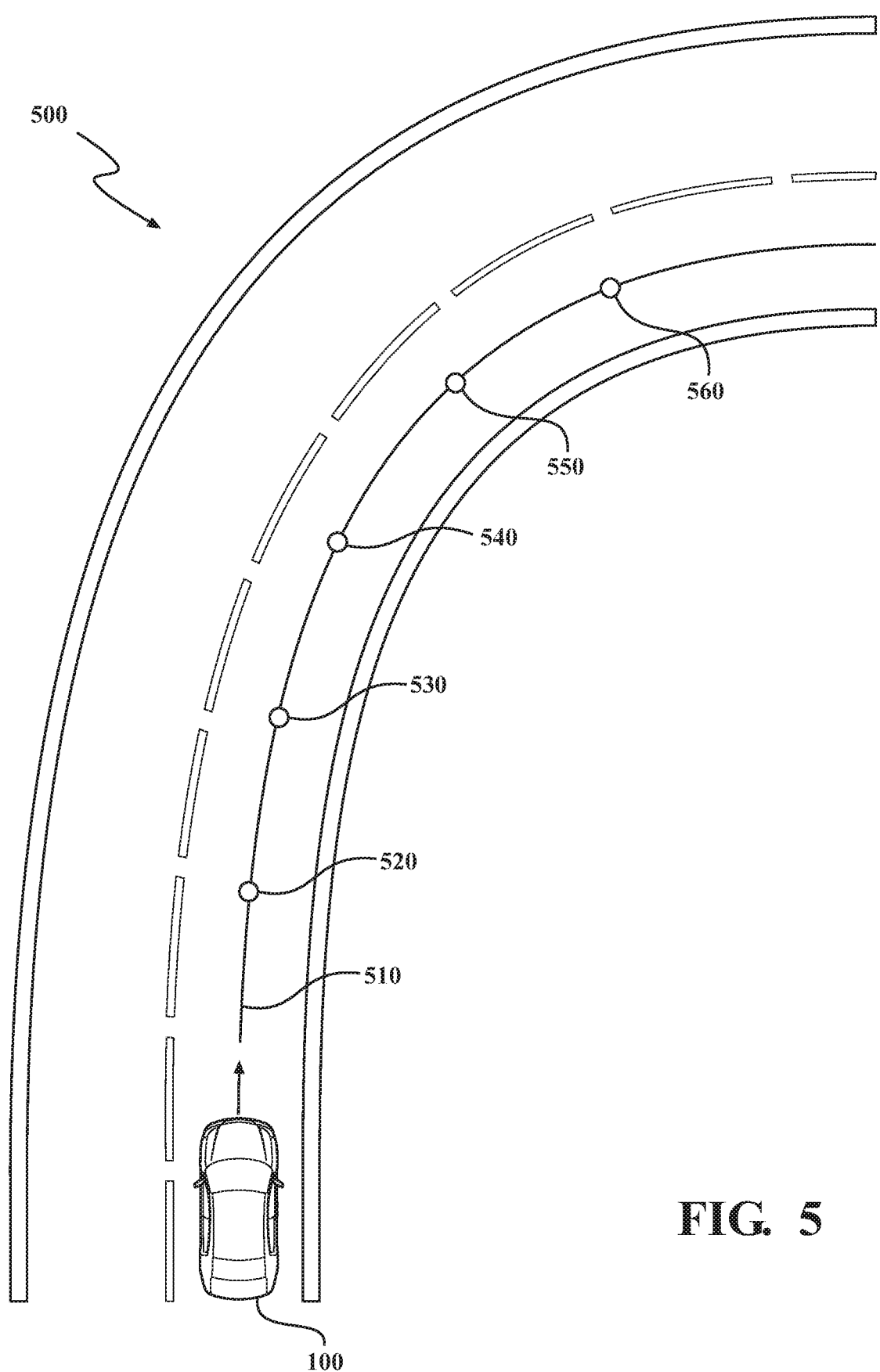
FIG. 5 illustrates an overhead view of a roadway.
Figure 6:
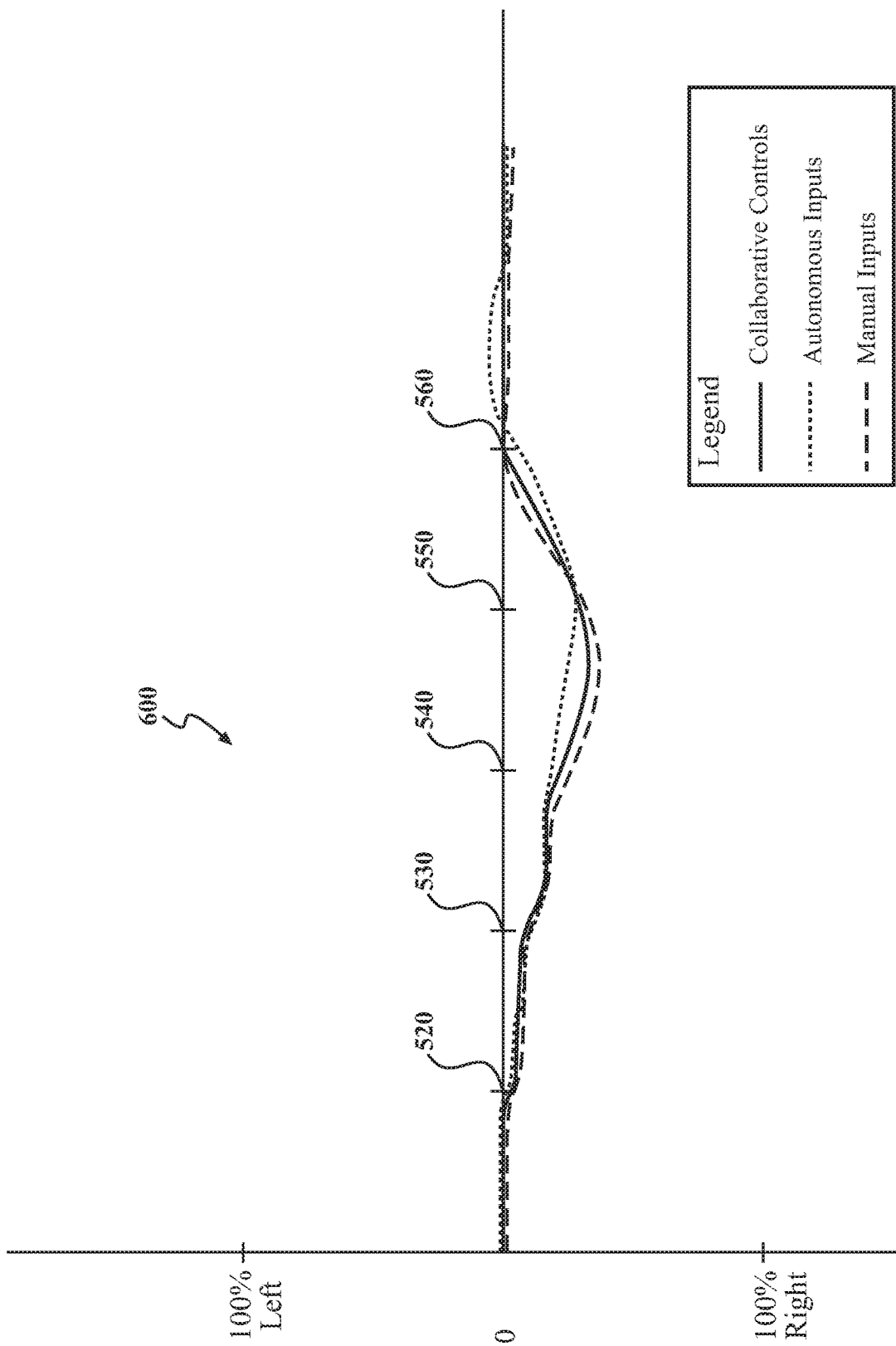
FIG. 6 illustrates a graph of manual inputs, autonomous inputs, and collaborative controls as may be provided for the roadway of FIG. 5.

FIG. 5 illustrates an overhead view of a roadway 500. The vehicle 100 is illustrated as following the roadway 500 along a route 510. The route 510 is illustrated with waypoints 520, 530, 540, 550, and 560 and generally illustrates a planned path produced by, for example, the autonomous driving module 160 and/or the controls module 220. FIG. 6 illustrates a graph 600 of manual inputs, autonomous inputs, and collaborative controls as may be provided for the roadway 500 of FIG. 5 at the various waypoints 520, 530, 540, 550, and 560. Accordingly, as shown in the graph 600, the collaborative controls are an output of the controls module 220 that results from blending the illustrated manual inputs and the autonomous inputs to varying degrees/ratios along the route 510 in order to achieve semi-autonomous operation of the vehicle 100 using shared controls. Thus, as shown, the controls module 220 between 540 and 550 provides a greater weight to the manual inputs per preferences of the driver as provided through the personalization feedback 380. Through further portions of the route 510, the inputs are generally blended according to an even weighting. Thus, the collaborative system 170 can vary how the collaborative controls are provided over separate instances in time according to the feedback mechanisms and particular aspects of each individual circumstance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle driver (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 370-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the collaborative system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the collaborative system 170, and/or the autonomous driving module(s) 160 may control some or all of these vehicle systems 140 and, thus, may be partially or fully autonomous.

The processor(s) 110, the collaborative system 170, and/or the autonomous driving module(s) 160 can be operatively connected to communicate with the various vehicle systems 140 and/or individual components thereof. For example, returning to FIG. 1, the processor(s) 110, the collaborative system 170, and/or the autonomous driving module(s) 160 can be in communication to send and/or receive information from the various vehicle systems 140 to control the movement, speed, maneuvering, heading, direction, etc. of the vehicle 100. The processor(s) 110, the collaborative system 170, and/or the autonomous driving module(s) 160 may control some or all of these vehicle systems 140.

The processor(s) 110, the collaborative system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the collaborative system 170, and/or the autonomous driving module(s) 160 can control the direction and/or speed of the vehicle 100. The processor(s) 110, the collaborative system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the collaborative system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A collaborative system for providing collaborative control of a vehicle, comprising:
   one or more processors;
   a memory communicably coupled to the one or more processors and storing:
      a controls module including instructions that when executed by the one or more processors cause the one or more processors to, in response to receiving manual inputs and autonomous inputs for controlling the vehicle, determine a difference between the manual inputs and the autonomous inputs, blend the manual inputs and the autonomous inputs together into collaborative controls as a function of at least the difference, and feedback parameters to control the vehicle to proceed along a route; and
      a feedback module including instructions that when executed by the one or more processors cause the one or more processors to generate feedback according to at least the difference to adapt how the vehicle is controlled by generating an adaptation feedback, a personalization feedback, and a coaching feedback simultaneously to modify how the collaborative controls are produced through three parallel feedback mechanisms.

2. The collaborative system of claim 1, wherein the feedback module further includes instructions to generate the feedback including instructions to generate the adaptation feedback that adjusts autonomous parameters for controlling how the vehicle generates the autonomous inputs, wherein the feedback module further includes instructions to generate the adaptation feedback by at least logging driving data about how the vehicle is proceeding along the route, and
   wherein the feedback module further includes instructions to generate the adaptation feedback by applying a machine learning algorithm to the driving data to produce the autonomous parameters to optimize safety when the vehicle generates the autonomous inputs.

3. The collaborative system of claim 1, wherein the feedback module further includes instructions to generate the feedback including instructions to generate the personalization feedback that adjusts autonomous parameters for controlling how the vehicle generates the autonomous inputs according to driving preferences of a driver of the vehicle, and
   wherein the feedback module further includes instructions to generate the personalization feedback including instructions to analyze personalization data to identify the driving preferences for the driver and modifying autonomous parameters according to the driving preferences.

4. The collaborative system of claim 3, wherein the feedback module further includes instructions to generate the personalization feedback including instructions to acquire personalization data including at least acquiring electronic feedback inputs from the driver, logging driving data about how the vehicle is proceeding along the route, and logging the manual inputs, and
   wherein the driving preferences include at least one of lane position preference, preferences of following distances, velocity preferences, braking preferences, and acceleration preferences.

5. The collaborative system of claim 1, wherein the feedback module further includes instructions to generate the feedback including instructions to generate the coaching feedback to induce a driver to adjust the manual inputs, and
   wherein the feedback module further includes instructions to generate the coaching feedback including instructions to analyze the difference in relation to a present environment of the vehicle to identify whether the manual inputs are an acceptable manner for controlling the vehicle and generating the coaching feedback to induce the driver to adjust the manual inputs by generating at least one of forced feedback in a steering wheel, and one or more indicators about the manual inputs to the driver.

6. The collaborative system of claim 1, wherein the controls module further includes the instructions to blend the autonomous inputs and the manual inputs to generate the collaborative controls that control at least steering of the vehicle, and wherein the controls module further includes the instructions to blend including instructions to vary a weight of the manual inputs versus the autonomous inputs according to at least the difference and conditions of a present environment of the vehicle, wherein the controls module further includes the instructions to blend in order to provide the collaborative controls as a semi-autonomous control of the vehicle.

7. The collaborative system of claim 1, wherein the manual inputs are electronic controls received by the vehicle from a driver through one or more input/output devices of the vehicle, and wherein the autonomous inputs are electronic controls produced by the vehicle for autonomously controlling the vehicle along the route.

8. The collaborative system of claim 1, wherein the vehicle includes a dual input mechansim that accepts the manual inputs and the autonomous inputs and that selectively isolates a driver from how the controls module blends the autonomous inputs and the manual inputs.

9. A non-transitory computer-readable medium for providing collaborative control of a vehicle and storing instructions that when executed by one or more processors cause the one or more processors to:

in response to receiving manual inputs and autonomous inputs for controlling the vehicle, determine a difference between the manual inputs and the autonomous inputs;

blend the manual inputs and the autonomous inputs together into collaborative controls as a function of at least the difference, and feedback parameters to control the vehicle to proceed along a route; and generate feedback according to at least the difference to adapt how the vehicle is controlled by generating an adaptation feedback, a personalization feedback, and a coaching feedback simultaneously to modify how the collaborative controls are produced through three parallel feedback mechanisms.

10. The non-transitory computer-readable medium of claim 9, wherein the instructions to wherein the instructions to generate the feedback include instructions to generate the adaptation feedback that adjusts autonomous parameters for controlling how the vehicle generates the autonomous inputs, wherein the instructions to generate the adaptation feedback include instructions to at least log driving data about how the vehicle is proceeding along the route, and wherein the instructions to generate the adaptation feedback include instructions to apply a machine learning algorithm to the driving data to produce the autonomous parameters to optimize safety when the vehicle generates the autonomous inputs.

11. The non-transitory computer-readable medium of claim 9, wherein the instructions to generate the feedback include instructions to generate the personalization feedback to adjust autonomous parameters for controlling how the vehicle generates the autonomous inputs according to driving preferences of a driver of the vehicle, and wherein the instructions to generate the personalization feedback include instructions to analyze personalization data to identify the driving preferences for the driver and modify autonomous parameters according to the driving preferences.

12. The non-transitory computer-readable medium of claim 9, wherein the instructions to generate the feedback include instructions to generate the coaching feedback to induce a driver to adjust the manual inputs, and wherein the instructions to generate the coaching feedback include instructions to analyze the difference in relation to a present environment of the vehicle to identify whether the manual inputs are an acceptable manner for controlling the vehicle and generating the coaching feedback to induce the driver to adjust the manual inputs by generating at least one of forced feedback in a steering wheel, and one or more indicators about the manual inputs to the driver.

13. The non-transitory computer-readable medium of claim 9, wherein the instructions to blend the autonomous inputs and the manual inputs to generate the collaborative controls that control at least steering of the vehicle, wherein the instructions to blend include instructions to vary a weight of the manual inputs versus the autonomous inputs according to at least the difference and conditions of a present environment of the vehicle, and wherein the instructions to blend provide the collaborative controls as a semi-autonomous control of the vehicle.

14. A method for providing collaborative control of a vehicle, comprising:

in response to receiving manual inputs and autonomous inputs for controlling the vehicle, determining a difference between the manual inputs and the autonomous inputs;

blending the manual inputs and the autonomous inputs together into the collaborative controls as a function of at least the difference, and feedback parameters to control the vehicle to proceed along a route; and generating feedback according to at least the difference to adapt how the vehicle is controlled by generating an adaptation feedback, a personalization feedback, and a coaching feedback simultaneously to modify how the collaborative controls are produced through three parallel feedback mechanisms.

15. The method of claim 14, wherein generating the feedback includes generating the adaptation feedback that adjusts autonomous parameters for controlling how the vehicle generates the autonomous inputs, wherein generating the adaptation feedback includes logging driving data about how the vehicle is proceeding along the route, and wherein generating the adaptation feedback includes applying a machine learning algorithm to the driving data to produce the autonomous parameters to optimize safety when the vehicle generates the autonomous inputs.

16. The method of claim 14, wherein generating the feedback includes generating the personalization feedback that adjusts autonomous parameters for controlling how the vehicle generates the autonomous inputs according to driving preferences of a driver of the vehicle, and wherein generating the personalization feedback includes analyzing personalization data to identify the driving preferences for the driver and modifying the autonomous parameters according to the driving preferences.

17. The method of claim 16, wherein generating the personalization feedback includes acquiring personalization data including at least acquiring electronic feedback inputs from the driver, logging driving data about how the vehicle is proceeding along the route, and logging the manual inputs, and wherein the driving preferences include at least one of lane position preference, preferences of following distances, velocity preferences, braking preferences, and acceleration preferences.

18. The method of claim 14, wherein generating the feedback includes generating the coaching feedback to induce a driver to adjust the manual inputs, and wherein generating the coaching feedback includes analyzing the difference in relation to a present environment of the vehicle to identify whether the manual inputs are an acceptable manner for controlling the vehicle and generating the coaching feedback to induce the driver to adjust the manual inputs by generating at least one of forced feedback in a steering wheel, and one or more indicators about the manual inputs to the driver.

19. The method of claim 14, wherein blending the autonomous inputs and the manual inputs generates the collaborative controls that control at least steering of the vehicle, wherein blending includes varying a weight of the manual inputs versus the autonomous inputs according to at least the difference and conditions of a present environment of the vehicle, and wherein blending provides the collaborative controls as a semi-autonomous control of the vehicle.

20. The method of claim 14, wherein the manual inputs are electronic controls received by the vehicle from a driver through one or more input/output devices of the vehicle, and wherein the autonomous inputs are electronic controls produced by the vehicle for autonomously controlling the vehicle along the route.

\* \* \* \* \*

UNITED STATES PATENT AND TRADEMARK OFFICE
CERTIFICATE OF CORRECTION

PATENT NO. : 10,543,853 B2
APPLICATION NO. : 15/641643
DATED : January 28, 2020
INVENTOR(S) : Heishiro Toyoda and Terumasa Endo It is certified that error appears in the above-identified patent and that said Letters Patent is hereby corrected as shown below:

In the Claims

Column 22, Line 66:
Delete "and" after "vehicle," and before "wherein"

Column 23, Line 3:
Add "and" after "vehicle,"

Signed and Sealed this
Thirtieth Day of August, 2022

Katherine Kelly Vidal
*Director of the United States Patent and Trademark Office*